(12) United States Patent
Takada

(10) Patent No.: US 11,101,487 B2
(45) Date of Patent: Aug. 24, 2021

(54) FUEL CELL BATTERY

(71) Applicant: HONDA MOTOR CO., LTD., Tokyo (JP)

(72) Inventor: Hideaki Takada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 30 days.

(21) Appl. No.: 16/366,493

(22) Filed: Mar. 27, 2019

(65) Prior Publication Data

US 2019/0305350 A1    Oct. 3, 2019

(30) Foreign Application Priority Data

Mar. 29, 2018   (JP) .............................. JP2018-064035

(51) Int. Cl.
*H01M 8/249* (2016.01)
*H01M 8/2465* (2016.01)

(52) U.S. Cl.
CPC ......... *H01M 8/249* (2013.01); *H01M 8/2465* (2013.01)

(58) Field of Classification Search
CPC .......................... H01M 8/2465; H01M 8/249
See application file for complete search history.

(56) References Cited

U.S. PATENT DOCUMENTS 4,038,462 A  *  7/1977  Rohr ................. H01M 10/3909
                                                                 429/479

FOREIGN PATENT DOCUMENTS

| DE | 10-2004-060526 | * | 6/2006 | ............. H01M 8/24 |
| DE | 102004060526 A1 | | 6/2006 | |
| JP | 4136443 | | 8/2008 | |

OTHER PUBLICATIONS

Great Britain Office Action dated Sep. 18, 2019, 10 pages.

* cited by examiner

*Primary Examiner* — Osei K Amponsah
(74) *Attorney, Agent, or Firm* — Rankin, Hill & Clark LLP

(57) ABSTRACT

A fuel cell battery includes a plurality of stacks. Each of the stacks is a module containing a cell, and a base plate and a cover plate sandwiching the cell therebetween. In a state where the stacks are stacked together with a gasket being sandwiched between two adjacent stacks of the stacks, the two adjacent stacks are connected to each other by a connecting bolt. The gasket has, at a central part thereof, a contact plate that is elastic and electrically conductive. When the gasket is sandwiched between the two adjacent stacks, the contact plate is brought into abutment with the cover plate and the base plate.

5 Claims, 4 Drawing Sheets

FUEL CELL BATTERY

CROSS-REFERENCE TO RELATED APPLICATION

This application is based upon and claims the benefit of priority from Japanese Patent Application No. 2018-064035 filed on Mar. 29, 2018, the contents of which are incorporated herein by reference.

BACKGROUND OF THE INVENTION

Field of the Invention

The present invention relates to a fuel cell battery containing a plurality of cells stacked together.

Description of the Related Art

A fuel cell battery containing a plurality of cells stacked together has been known. For example, as disclosed in Japanese Patent No. 4136443, a stationary end plate is disposed at one end of a stack body of the stacked cells, and a movable plate is disposed at the other end. The movable plate is pressed toward the stack body by a cylinder of another stationary end plate provided at the other end, whereby a pressure is applied to the cells of the stack body. The stationary end plates disposed at the one end and the other end of the stack body are fixed in the axial direction by a fastening rod.

SUMMARY OF THE INVENTION

In the fuel cell battery containing the stack body of the plate cells, it is desirable that a desired load be applied uniformly to the entire cells for the purpose of achieving a desired power generation performance. Therefore, the stationary end plate and the movable plate are arranged at the both ends of the cells in the stacking direction, and the movable plate is pressed by the cylinder to thereby apply the desired load to the cells.

However, as the number of the cells is increased, production errors of the components and piece-to-piece variations are cumulatively increased accordingly, so that the load cannot be uniformly applied to the cells in the stacking direction. Consequently, the contact pressure between the cells in the stack may be lowered, resulting in an increased electric resistance. As a result, the power generation efficiency may be reduced, and a sealing surface pressure of a port for supplying and discharging a fuel may be lowered, resulting in gas leakage.

A general object of the present invention is to provide a fuel cell battery in which a plurality of stacks can be easily and reliably joined together under a predetermined pressure applied in the stacking direction.

According to an aspect of the present invention, there is provided a fuel cell battery including a plurality of stacks stacked together in a stacking direction, the stacks each having a cell. The stacks each have a first base disposed on one end side of the cell in the stacking direction, and a second base disposed on the other end side of the cell in the stacking direction. In two adjacent stacks of the stacks, the first base of one stack and the second base of the other stack are arranged facing each other and are connected to each other in the stacking direction by a fastening member.

In the present invention, each of the stacks of the fuel cell battery has the first base disposed on the one end side of the cell in the stacking direction and the second base disposed on the other end side of the cell arranged in the stacking direction. In the two adjacent stacks, the first base of the one stack and the second base of the other stack are arranged facing each other in the stacking direction, and are connected to each other by the fastening member.

Since the first base of the stack and the second base of the adjacent stack can be connected by the fastening member, even when multiple stacks are stacked together, production errors of the components and component-to-component variations in the stacks are not cumulatively increased.

Thus, as compared with a conventional fuel cell battery in which a plurality of cells are interposed between a stationary end plate and a movable plate and a load is applied to the resultant stacks, a load can be applied uniformly to the stacks in the stacking direction in the fuel cell battery of the present invention. Therefore, the stacks can be stacked and connected easily and reliably under a predetermined pressure. Furthermore, a space between the stacks can be sufficiently sealed.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
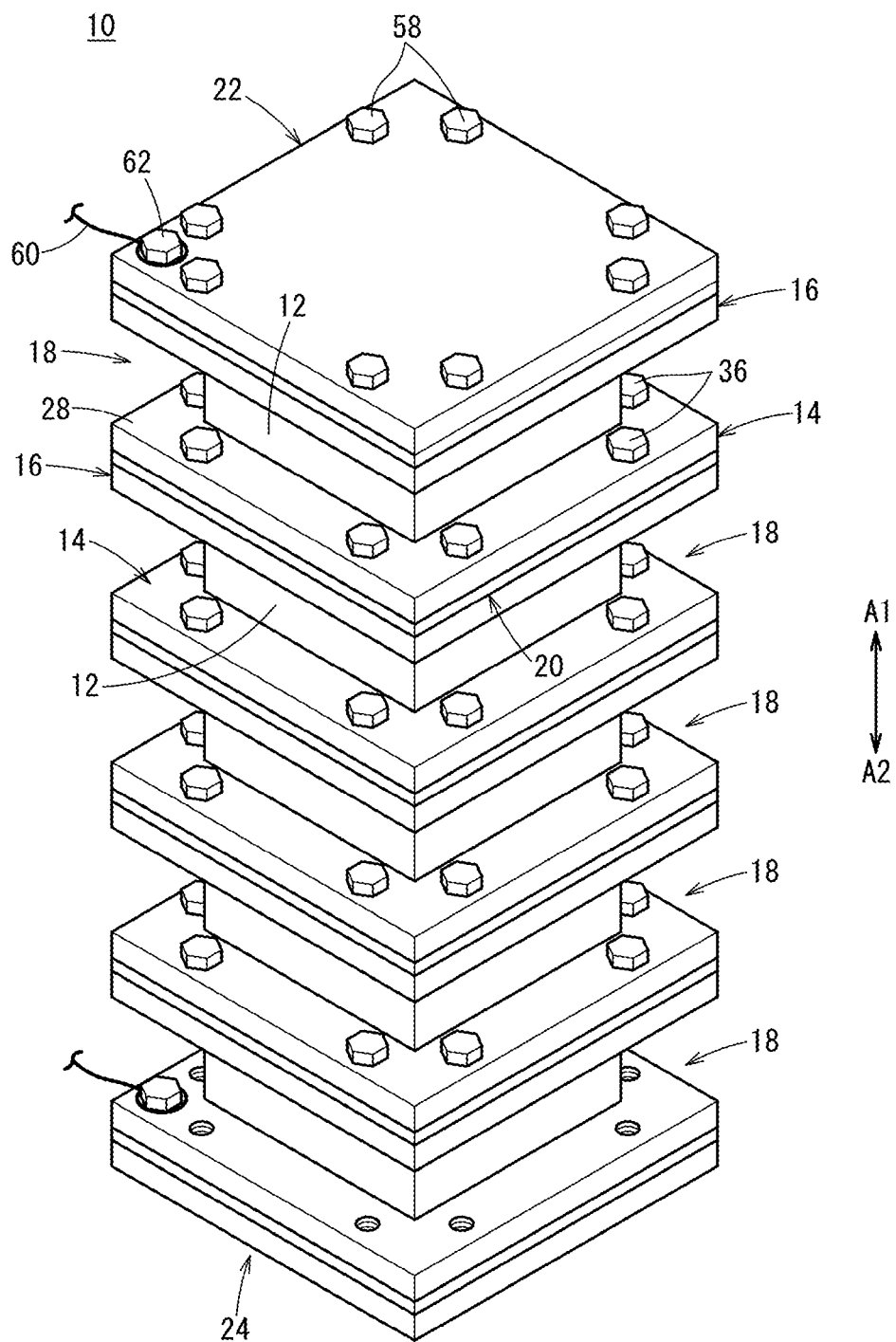
FIG. 1 is a perspective outline view of a fuel cell battery according to an embodiment of the present invention.
Figure 2:
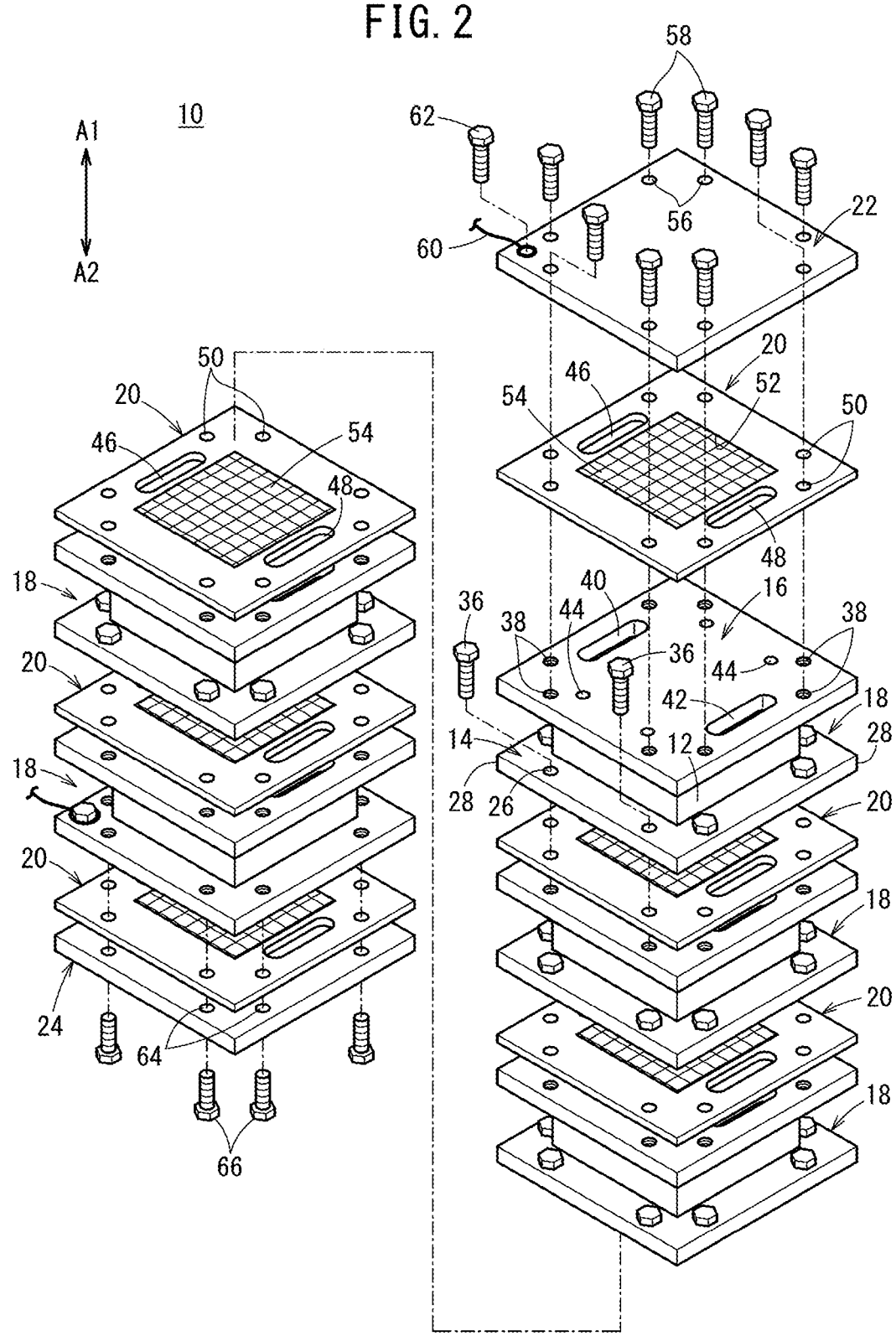
FIG. 2 is an exploded perspective view of the fuel cell battery of FIG. 1.

As shown in FIGS. 1 and 2, a fuel cell battery 10 according to an embodiment of the present invention contains stacks 18. The stack 18 is a module containing a cell 12, a base plate (first base) 14, and a cover plate (second base) 16. The base plate 14 is in contact with one end side of the cell 12, and the cover plate 16 is in contact with the other end side of the cell 12. The stack 18 may contain one or a plurality of the cells 12. In the fuel cell battery 10, a plurality of the stacks 18 are stacked together in a stacking direction, and a gasket 20 is interposed between the base plate 14 of the stack 18 and the cover plate 16 of the adjacent stack 18. In this embodiment, the fuel cell battery 10 contains five stacks 18 stacked together.

In the fuel cell battery 10 containing the stacks 18 stacked together, a top cover 22 is disposed at one end in the stacking direction indicated by arrows A1, A2 (i.e., an end in the direction of arrow A1), and a bottom cover 24 is disposed at the other end (i.e., an end in the direction of arrow A2). Thus, both ends of the fuel cell battery 10 are covered with the top cover 22 and the bottom cover 24.

Though not shown in the drawings, the cell 12 contains an electrolyte membrane, an anode layer and a cathode layer formed on either side of the electrolyte membrane, and separators arranged outside of the anode layer and the cathode layer. The separators have a gas passage 12a (see FIG. 3).

Figure 3:
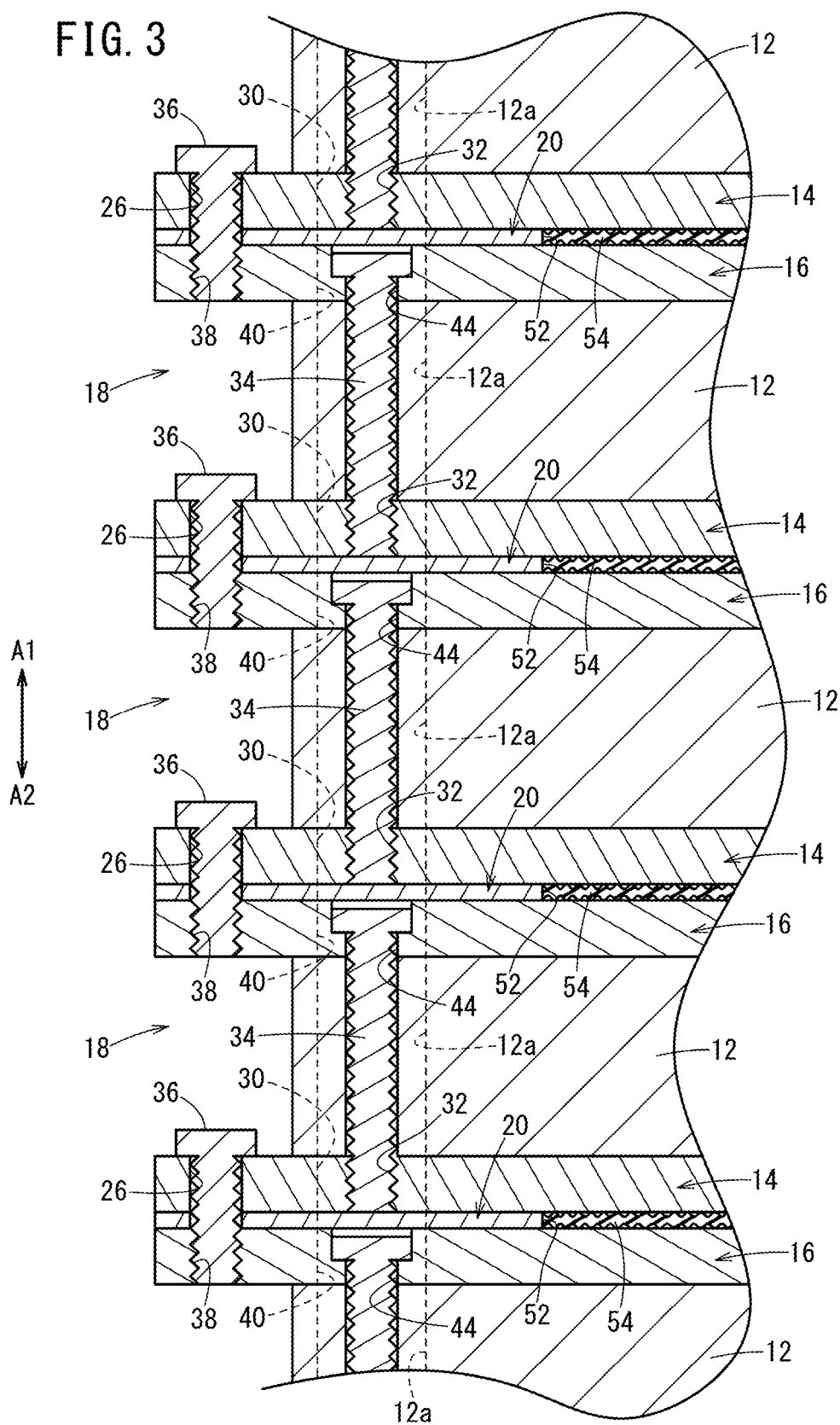
FIG. 3 is an enlarged cross-sectional view of outer peripheries of a base plate and a cover plate in the fuel cell battery of FIG. 1.

As shown in FIGS. 1 to 3, for example, the base plate 14 is a rectangular plate having an area larger than that of the cell 12. First bolt holes 26 penetrating through the plate in the thickness direction (the direction of the arrows A1, A2) are formed in the vicinity of four corners 28 of the base plate 14. More specifically, a pair of the first bolt holes 26 are formed in the vicinity of each corner 28 of the base plate 14 with the corner 28 interposed between the pair. Thus, the base plate 14 has eight first bolt holes 26.

The base plate 14 has a pair of a first supply port 30 (see FIG. 3) and a first discharge port (not shown), which are provided adjacent to the cell 12. The first supply port 30 is used for supplying a reactant gas (fuel), and the first discharge port is used for discharging an excess of the reactant gas. For example, the first supply port 30 and the first discharge port have long oval shapes, are arranged approximately parallel to each other, and extend through the base plate 14 in the thickness direction (the direction of the arrows A1, A2).

Furthermore, a second bolt hole 32 extending along the longitudinal direction of the first supply port 30 and the first discharge port is formed in the base plate 14. The second bolt hole 32 is a screw hole having an threaded inner surface. A fixing bolt 34 for fixing the cell 12, the base plate 14, and the cover plate 16 of the stack 18 in the thickness direction (the direction of the arrows A1, A2) is screw-engaged into the second bolt hole 32.

Thus, in the base plate 14, the second bolt hole 32, the first supply port 30, and the first discharge port are formed on an inner side of the first bolt hole 26.

The cover plate 16 is a plate having a shape approximately equal to that of the base plate 14. The cover plate 16 is arranged facing the base plate 14 across the cell 12 (i.e., the cell 12 is sandwiched between the cover plate 16 and the base plate 14). Third bolt holes 38 are formed in the vicinity of four corners of the cover plate 16. The third bolt holes 38 are located at positions corresponding to the first bolt holes 26. A connecting bolt (fastening member) 36 inserted into the first bolt hole 26 is screw-engaged into the third bolt hole 38. The third bolt hole 38 is a screw hole having an threaded inner surface. The cover plate 16 has eight third bolt holes 38 corresponding to the eight first bolt holes 26 of the base plate 14.

As shown in FIGS. 2 and 3, the cover plate 16 has a second supply port 40 and a second discharge port 42, which are adjacent to the cell 12. The second supply port 40 and the second discharge port 42 are aligned respectively with the first supply port 30 and the first discharge port of the base plate 14 in the thickness direction. The second supply port 40 and the second discharge port 42 have long oval shapes approximately equal to those of the first supply port 30 and the first discharge port (see FIG. 2).

Furthermore, the cover plate 16 has four fourth bolt holes 44 formed on an inner side of the third bolt holes 38. The fourth bolt holes 44 in the cover plate 16 are aligned with the respective second bolt holes 32 in the base plate 14 in the thickness direction.

The fixing bolt 34 is inserted into the fourth bolt hole 44 from the cover plate 16 toward the cell 12 (in the direction of arrow A2) and passes through the cell 12, and then the fixing bolt 34 is screw-engaged into the second bolt hole 32 of the base plate 14. Consequently, the cover plate 16, the cell 12, and the base plate 14 are integrally fixed in the thickness direction (in the stacking direction) to thereby form one modularized stack 18.

As shown in FIGS. 1 to 4, for example, the gasket 20 is a plate of a mica or the like having a constant thickness. The gasket 20 has an area approximately equal to those of the base plate 14 and the cover plate 16. The gasket 20 is interposed between the upper surface of the cover plate 16 of the stack 18 and the lower surface of the base plate 14 of the adjacent stack 18.

As shown in FIG. 2, the gasket 20 has a supply hole 46 and a discharge hole 48, and further has eight through-holes 50. The supply hole 46 and the discharge hole 48 are arranged so as to face respectively the first supply port 30 and the first discharge port of the base plate 14 and communicate respectively with them, and also so as to face respectively the second supply port 40 and the second discharge port 42 of the cover plate 16 and communicate respectively with them. The connecting bolts 36 are inserted into the through-holes 50.

Therefore, in the two adjacent stacks 18, a space between the first supply port 30 and the second supply port 40 and a space between the first discharge port and the second discharge port 42 are sealed by the gasket 20, whereby leakage of the reactant gas to outside is prevented.

A container hole 52 having a rectangular cross-section penetrates through the central part of the gasket 20 in the thickness direction (the direction of the arrows A1, A2). A contact plate (plate) 54 is placed in the container hole 52. For example, the contact plate 54 is formed by shaping a conductive steel plate so that the contact plate 54 is elastic and has a thickness approximately equal to or slightly larger than that of the gasket 20.

Figure 4:
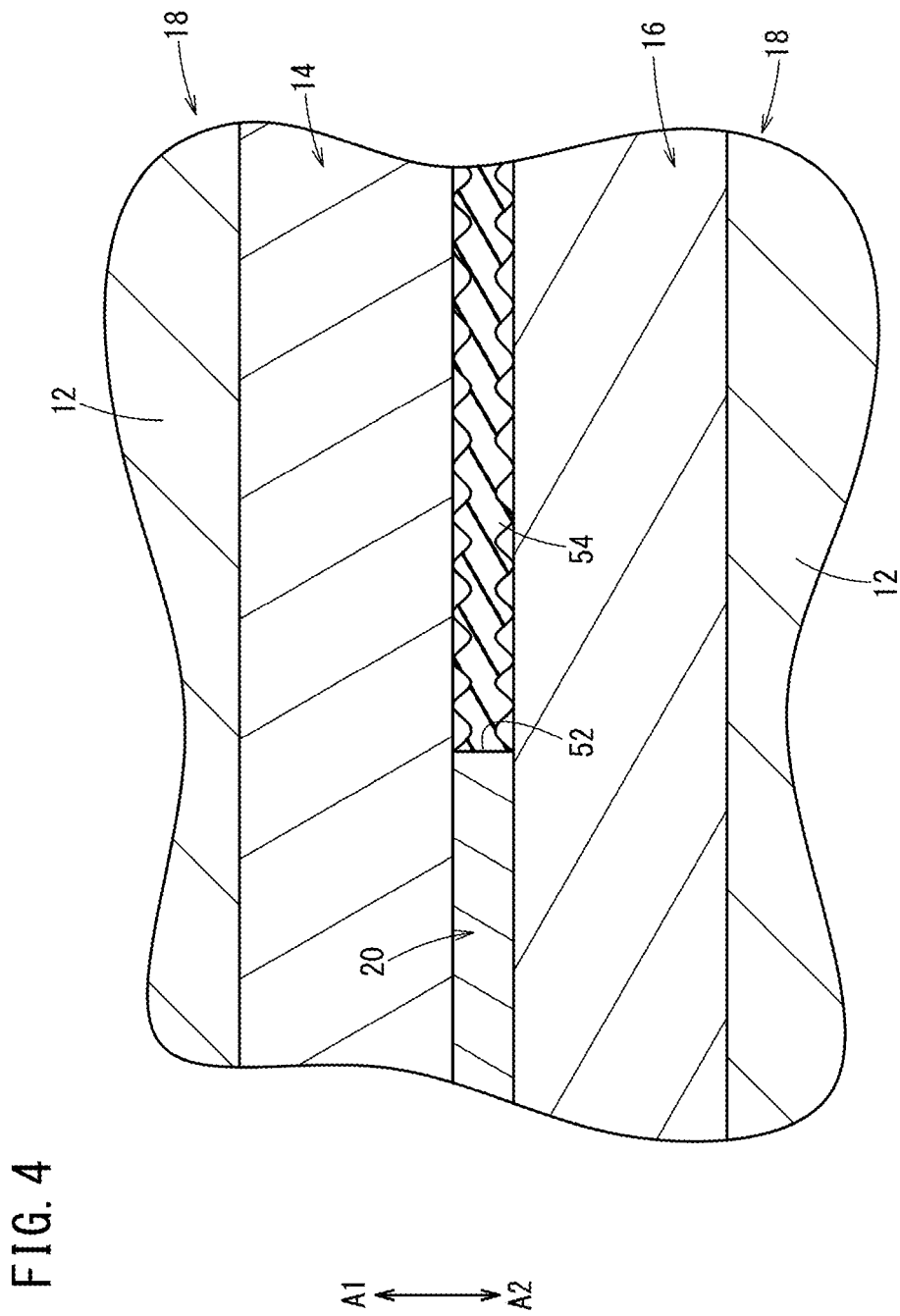
FIG. 4 is a further enlarged cross-sectional view of a gasket shown in FIG. 3.

As shown in FIGS. 3 and 4, the contact plate 54 has surfaces that face the stacks 18, each of the surfaces having a concave-convex cross section (a corrugated shape in cross section). Therefore, when the contact plate 54 is in contact with the base plate 14 and the cover plate 16 of the stack 18, a sufficient contact pressure can be applied to both surfaces of the contact plate 54.

When the stacks 18 are stacked in the stacking direction of the fuel cell battery 10 (the direction of the arrows A1, A2), the gasket 20 having the contact plate 54 is sandwiched between the base plate 14 of the stack 18 and the cover plate 16 of the adjacent lower stack 18, which is located on the bottom cover 24 side. The connecting bolt 36 is inserted into the first bolt hole 26 of the base plate 14 and is screw-engaged into the third bolt hole 38 of the cover plate 16 through the through-hole 50 of the gasket 20, whereby the two adjacent stacks 18 are connected in the stacking direction (the direction of the arrows A1, A2). Thus, eight connecting bolts 36 are used correspondingly to the numbers of the first and third bolt holes 26, 38.

As shown in FIGS. 1 and 2, each of the top cover 22 and the bottom cover 24 is a plate having a shape equal to those of the base plate 14 and the cover plate 16. The top cover 22 is disposed on the cover plate 16 of the stack 18 located at the extreme one end (in the direction of arrow A1) with the gasket 20 being sandwiched therebetween. Eight first fastening bolts 58 are inserted into holes 56 of the top cover 22 and are screw-engaged into the third bolt holes 38 of the cover plate 16, whereby the top cover 22 is fixed to the cover plate 16.

A power line 60 serving as a power wire is connected to a corner of the top cover 22 by a bolt 62 for power transmission. For example, electric power generated in the cell 12 is outputted to the outside by the power line 60.

On the other hand, the bottom cover 24 is disposed on the base plate 14 of the stack 18 located at the extreme other end (in the direction of arrow A2) with the gasket 20 being sandwiched therebetween. Eight second fastening bolts 66 are inserted into holes 64 of the bottom cover 24 and are screw-engaged into the first bolt holes 26 of the base plate 14, whereby the bottom cover 24 is fixed to the base plate 14. A supply opening and a discharge opening (not shown) are formed in the bottom cover 24. The supply opening is located in a position corresponding to the first supply port 30 and the second supply port 40 of each stack 18, and the discharge opening is located in a position corresponding to the first discharge port and the second discharge port 42 of each stack 18.

The reactant gas is supplied from the supply opening and then flows through the first supply port 30 and the second supply port 40 of each stack 18 in the stacking direction (the direction of arrow A1), and the reactant gas is supplied to each cell 12. Excess of the reactant gas flows in the stacking direction (the direction of arrow A2) through the first discharge port and the second discharge port 42 in each stack 18, and is discharged from the discharge opening to the outside.

The fuel cell battery 10 according to this embodiment of the present invention basically has the above-described structure. Next, a method for stacking a plurality of the cells 12 will be described below. In this method, as shown in FIGS. 1 and 2, five stacks 18 are stacked and assembled.

First, the gasket 20 is placed between two adjacent stacks of the stacks 18 in the stacking direction of the fuel cell battery 10 (the direction of the arrows A1, A2). The cover plate 16 of one stack 18 located at a lower position (in the direction of arrow A2) is arranged so as to face the base plate 14 of the other stack 18 located at an upper position (in the direction of arrow A1), and the gasket 20 having the contact plate 54 is placed between the cover plate 16 and the base plate 14. Then, the cover plate 16 and the base plate 14 are brought into abutment with each other through the gasket 20.

Thus, the gasket 20 is sandwiched between the one stack 18 and the other stack 18.

The first bolt hole 26 in the base plate 14 of each stack 18 and the third bolt hole 38 in the cover plate 16 of each stack 18 are aligned with each other in the stacking direction of the stacks 18 (in the direction of the arrows A1, A2). Then, the connecting bolt 36 is inserted into the first bolt hole 26, and is screw-engaged through the through-hole 50 of the gasket 20 into the third bolt hole 38.

Thus, in the two stacks 18 that are adjacent to each other in the stacking direction, the base plate 14 of the other stack 18 and the cover plate 16 of the one stack 18 are connected by the connecting bolt 36, so that the two adjacent stacks 18 are stacked and connected.

In this process, there are cases that the base plate 14 or the cover plate 16 may be deformed due to a reaction force or the like from a component of the stack 18. Even in such cases, the contact plate 54 of the gasket 20 sandwiched between the base plate 14 and the cover plate 16 can be elastically deformed to thereby compensate or absorb the deformation of the base plate 14 or the cover plate 16 suitably.

Therefore, the stacks 18 can be stacked highly accurately in a desired position without influence of the deformation which will be caused when the stacks 18 are joined together, and can be connected under a load uniformly applied in the stacking direction. Consequently, the stacks 18 can be reliably connected under a predetermined contact pressure.

Finally, the top cover 22 and the bottom cover 24 are fixed to the uppermost stack 18 and the lowermost stack 18 by the first and second fastening bolts 58, 66, respectively, to thereby produce the fuel cell battery 10 containing a plurality of the stacks 18 stacked together.

As described above, according to the present embodiment, in the fuel cell battery 10 containing the stacks 18 stacked together, the cell 12, the base plate 14 covering one end of the cell 12, and the cover plate 16 covering the other end of the cell 12 are modularized to thereby form the stack 18, a plurality of the stacks 18 are stacked in the stacking direction (the direction of the arrows A1, A2) of the fuel cell battery 10, and the base plate 14 of the stack 18 and the cover plate 16 of the adjacent stack 18 facing each other are connected by a plurality of the connecting bolts 36.

The two adjacent stacks 18 are connected to each other by the connecting bolts 36 in the above manner. Therefore, even when multiple stacks 18 are stacked together, production errors of the components and component-to-component variations are not cumulatively increased in the stacks 18. In a conventional fuel cell battery, a plurality of cells are interposed between a stationary end plate and a movable plate, and a load is applied to the resultant stack. As compared to the conventional fuel cell battery, the fuel cell battery 10 of the present invention is capable of easily and accurately controlling the load so as to be uniformly applied to the stacks 18 in the stacking direction.

Consequently, in the present invention, a plurality of the stacks 18 can be stacked and connected to each other easily and reliably. Accordingly, a satisfactory sealing performance for preventing the leakage of the reactant gas from between the stacks 18 can be achieved.

In the present invention, the gasket 20 is interposed between the two adjacent stacks 18. Therefore, when the reactant gas flows through the first supply port 30, the second supply port 40, the first discharge port, and the second discharge port 42 in the adjacent stacks 18, it is possible to reliably prevent leakage of the reactant gas to the outside.

The gasket 20 is provided with the contact plate 54 that is elastic and electrically conductive, and the adjacent stacks 18 are brought into abutment on each other through the gasket 20. Therefore, for example, even when the base plate 14 or the cover plate 16 is deformed due to a reaction force or the like from a component of the stack 18 in the process of stacking the stacks 18, the deformation can be suitably absorbed or compensated by the elasticity of the contact plate 54.

Therefore, the stacks 18 can be stacked accurately at a predetermined position without influence of the deformation caused in the process of connecting the stacks 18 together. Consequently, the stacks 18 can be reliably connected under a predetermined contact pressure. As a result, the fuel cell battery 10 of the present invention can prevent increase of electric resistance, and can hence improve a power generation efficiency in comparison with the conventional fuel cell battery.

The stack 18 contains the cell 12, and the base plate 14 and the cover plate 16 sandwiching the cell 12 therebetween. Thus, the stack 18 has a simple structure. Therefore, the number of the stacks 18 in the fuel cell battery 10 can be easily changed, and hence such a changing procedure can be easily performed.

The base plate 14 and the cover plate 16 for connecting the stacks 18 have the same shape. Therefore, the stacks 18 can be easily connected by a simple procedure, and can be easily maintained and stored.

The stack 18 is in the form of the above-described module. Therefore, the number of the stacks 18 can be easily changed, so that the output of the fuel cell battery 10 can be easily controlled.

The connecting bolts 36 in the base plate 14 and the cover plate 16 are evenly and regularly arranged around the cell 12. Therefore, a fastening force (a load) can be uniformly applied to the cells 12 by the connecting bolts 36 in the process of connecting the stacks 18.

Although the fuel cell battery 10 contains five stacks 18 in the above embodiment, the number of the stacks 18 is not limited thereto. The number of the stacks 18 may be appropriately changed depending on a desired output.

It is to be understood that the fuel cell battery of the present invention is not limited to the above embodiment, and various changes and modifications may be made therein without departing from the scope of the invention.

What is claimed is:

1. A fuel cell battery comprising a plurality of stacks stacked together in a stacking direction, the stacks each having a cell,
   wherein:
   the stacks each have a first base disposed on one end side of the cell in the stacking direction, and a second base disposed on another end side of the cell in the stacking direction;
   in two adjacent stacks of the stacks, the first base of one stack and the second base of another stack are arranged facing each other and are connected to each other in the stacking direction by a fastening member;
   a gasket configured to prevent leakage of fuel from between the two adjacent stacks is disposed between the two adjacent stacks;
   the gasket is provided with a plate that is elastic and electrically conductive; and
   at least part of the plate is arranged facing the cell;
   a container hole which penetrates through a central part of the gasket in a thickness direction is formed;
   the plate is distinct from the gasket and is placed in the gasket; and
   the plate is in contact with the first base and the second base, thereby being elastically deformed, the plate being formed so as to have a thickness approximately equal to or larger than that of the gasket.

2. The fuel cell battery according to claim 1, wherein the plate has a surface that faces each of the stacks, the surface having a corrugated shape in the stacking direction.

3. The fuel cell battery according to claim 1, wherein the cell is sandwiched between the first base and the second base in each of the stacks.

4. The fuel cell battery according to claim 1, wherein the first base and the second base have a same shape.

5. The fuel cell battery according to claim 1, wherein the fastening member comprises a plurality of fastening members that are evenly arranged around the cell in the first base and the second base.

\* \* \* \* \*